United States Patent
Ichihashi et al.

(10) Patent No.: US 6,489,055 B1
(45) Date of Patent: Dec. 3, 2002

(54) LITHIUM SECONDARY BATTERY

(75) Inventors: Akira Ichihashi, Sumoto (JP); Ryuji Ohshita, Neyagawa (JP); Shin Fujitani, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 62 days.

(21) Appl. No.: 09/598,942

(22) Filed: Jun. 22, 2000

(30) Foreign Application Priority Data

Jun. 25, 1999 (JP) .............................. 11-179789

(51) Int. Cl.⁷ .................................. H01M 6/14
(52) U.S. Cl. .................. 429/188; 429/318; 429/322; 429/199; 429/231.95
(58) Field of Search ...................... 429/231.95, 318, 429/322, 323, 300, 188, 199

(56) References Cited

U.S. PATENT DOCUMENTS

| 4,450,214 | A | * | 5/1984 | Davis |
| 4,505,997 | A | | 3/1985 | Armand et al. |
| 5,021,308 | A | | 6/1991 | Armand et al. |
| 5,665,265 | A | * | 9/1997 | Gies et al. |
| 6,068,950 | A | * | 5/2000 | Gan et al. |
| 6,096,447 | A | * | 8/2000 | Gan et al. |
| 6,117,591 | A | * | 9/2000 | Takeuchi et al. |
| 6,200,701 | B1 | * | 3/2001 | Gan et al. |
| 6,203,942 | B1 | * | 3/2001 | Gan et al. |

FOREIGN PATENT DOCUMENTS

| JP | 7-85888 | | 3/1995 |
| JP | 08-321326 A | * | 12/1996 |
| JP | 11-135148 A | * | 5/1999 |

* cited by examiner

*Primary Examiner*—Patrick Ryan
*Assistant Examiner*—Susy Tsang-Foster
(74) *Attorney, Agent, or Firm*—Armstrong, Westerman & Hattori, LLP

(57) ABSTRACT

In a lithium secondary battery provided with a positive electrode capable of intercalating and eliminating lithium ions, a negative electrode capable of intercalating and eliminating lithium ions, and an electrolyte, at least one of an imide group lithium salt represented by $LiN(C_mF_{2m+1}SO_2)(C_nF_{2n+1}SO_2)$ (wherein m and n each denote an integer of 1 to 4 and may be the same or different from each other) and a methide group lithium salt represented by $LiC(C_pF_{2p+1}SO_2)(C_qF_{2q+1}SO_2)(C_rF_{2r+1}SO_2)$ (wherein p, q, and r each denote an integer of 1 to 4 and may be the same or different from each other) is contained as a chief component of a solute in the electrolyte, and one of or both of a fluoride and a phosphorus compound are added to the electrolyte.

19 Claims, 1 Drawing Sheet

LITHIUM SECONDARY BATTERY

BACKGROUND OF THE INVENTION

1. Field of the Invention

The present invention relates generally to a lithium secondary battery provided with a positive electrode capable of intercalating and eliminating lithium ions, a negative electrode capable of intercalating and eliminating lithium ions, and an electrolyte, and more particularly, to a lithium secondary battery whose charge/discharge cycle performance and storage characteristics in a charged state are improved upon improvement of its electrolyte.

2. Description of the Related Art

In recent years, secondary batteries have begun to be used in various fields such as electronic equipment and the like. A lithium secondary battery utilizing oxidation and reduction of lithium ions is attracting great attention as one of new-type secondary batteries having high power and high energy density.

Such a lithium secondary battery generally employs a carbon material capable of intercalating and eliminating lithium ions; a lithium metal; and a lithium alloy as a negative electrode active material for its negative electrode, a lithium-containing transition metal oxide such as $LiCoO_2$, $LiNiO_2$, $LiMn_2O_4$, or $LiFeO_2$ as a positive electrode active material for its positive electrode, and a non-aqueous electrolyte solution obtained by dissolving a solute of various lithium salts in an organic solvent; a polymer electrolyte comprising a polymer impregnated with a solute; and a gelated polymer comprising a polymer impregnated with a solute and an organic solvent as an electrolyte.

Examples of an organic solvent to be used in the above-mentioned electrolyte generally include ethylene carbonate, propylene carbonate, vinylene carbonate, butylene carbonate, diethyl carbonate, dimethyl carbonate, methyl ethyl carbonate, 1,2-diethoxyethane, 1,2-dimethoxyethane, ethoxymethoxyethane, and the like. These solvents may be used alone or in combination of two or more types. Further, examples of a solute to be used in the above-mentioned electrolyte generally include $LiPF_6$, $LiBF_4$, $LiCF_3SO_3$, $LiAsF_6$, $LiN(CF_3SO_2)_2$, $LiC(CF_3SO_2)_3$, $LiCF_3(CF_2)_3SO_3$, and the like.

However, in such a lithium secondary battery, charging and discharging are performed at high voltage. Accordingly, reaction between the above-mentioned negative electrode and electrolyte is induced, whereby particularly a solvent in the electrolyte is degraded upon decomposition. Therefore, a problem exists that the lithium secondary battery suffers degraded charge/discharge cycle performance and storage characteristics.

Therefore, in the prior art, Japanese Patent Laid-Open No. Hei7(1995)-85888 has proposed an electrolyte obtained by dissolving as a solute an imide group lithium salt represented by $Li(C_nX_{2n+1}Y)_2N$ (wherein X denotes halogen, n denotes an integer of 1 to 4, and Y denotes a CO group or an $SO_2$ group) in a concentration of 0.1 to 3 mole/liter in a mixed solvent containing at least one type of solvent selected from ethylene carbonate and propylene carbonate at 10 to 80 vol % and at least one type of solvent selected from diethoxyethane, chain carbonate, and acetonitrile at 20 to 90 vol %.

The above-mentioned gazette shows that charge/discharge cycle performance of the lithium secondary battery is improved by the use of such an electrolyte.

However, even in a case where the electrolyte employs as a solute the above-mentioned imide group lithium salt, the electrolyte is in direct contact with a positive electrode and negative electrode and hence, the electrolyte is decomposed upon reaction with a positive electrode active material or negative electrode active material when the battery is in a charged state. Accordingly, there still remains a problem that the battery suffers degraded storage characteristics in a charged state.

SUMMARY OF THE INVENTION

An object of the present invention is to attain excellent storage characteristics in a charged state in a lithium secondary battery provided with a positive electrode capable of intercalating and eliminating lithium ions, a negative electrode capable of intercalating and eliminating lithium ions, and an electrolyte by improving the electrolyte so that the electrolyte is prevented from being decomposed by a positive electrode active material or a negative electrode active material when the battery is stored in a charged state.

A lithium secondary battery according to the present invention is a lithium secondary battery provided with a positive electrode capable of intercalating and eliminating lithium ions, a negative electrode capable of intercalating and eliminating lithium ions, and an electrolyte, wherein at least one of an imide group lithium salt represented by $LiN(C_mF_{2m+1}SO_2)(C_nF_{2n+1}SO_2)$ (wherein m and n each denote an integer of 1 to 4 and may be the same or different from each other) and a methide group lithium salt represented by $LiC(C_pF_{2p+1}SO_2)(C_qF_{2q+1}SO_2)$ $(C_rF_{2r+1}SO_2)$ (wherein p, q, and r each denote an integer of 1 to 4 and may be the same or different from each other) is contained as a chief component of a solute in said electrolyte, and one of or both of a fluoride and phosphorus compound are added to said electrolyte.

As in the lithium secondary battery according to the present invention, when one of or both of a fluoride and phosphorus compound are added to the electrolyte containing at least one of the above-mentioned imide group lithium salt and methide group lithium salt as a chief component of the solute, a protective film is formed on a surface of the positive electrode and/or negative electrode by the fluoride and/or phosphorus compound. The protective film thus formed serves to prevent direct contact between the electrolyte and the positive electrode and/or negative electrode.

As a result, in the lithium secondary battery according to the present invention, the electrolyte is prevented from being decomposed even when the battery is stored in a charged state, whereby the storage characteristics of the battery in a charge state is improved.

As the above-mentioned fluoride to be added to the electrolyte, various types of known fluorides may be used. Specifically, it is preferable to use at least one type of fluoride selected from the group consisting of AgF, $CoF_2$, $CoF_3$, CuF, $CuF_2$, $FeF_2$, $FeF_3$, LiF, $MnF_2$, $MnF_3$, $SnF_2$, $SnF_4$, $TiF_3$, $TiF_4$, and $ZrF_4$. Further, as the above-mentioned phosphorus compound to be added to the electrolyte, various types of known phosphorus compound may be used. Specifically, it is preferable to use at least one type of phosphorus compound selected from the group consisting of $LiPO_3$ and $Li_3PO_4$.

In adding one of or both of the fluoride and phosphorus compound to the electrolyte as described above, if an amount of the fluoride and/or phosphorus compound added to the electrolyte is too large, a protective film formed on the surface of the positive electrode and/or negative electrode becomes thick, resulting in increased resistance. On the other hand, if the amount is too small, a sufficient protective film can not be formed on the surface of the positive electrode and/or negative electrode, whereby the electrolyte is decomposed upon reaction with the positive electrode and/or negative electrode. Accordingly, in either one of the cases, storage characteristics of the battery in a charged state are degraded. Therefore, in adding one of or both of the fluoride and phosphorus compound to the electrolyte, the amount of the additive is set preferably in the range of 0.001 to 10.0 wt % and more preferably 0.01 to 5.0 wt % based on the total weight of the electrolyte.

Further, when a gelated polymer electrolyte comprising a polymer impregnated with the above-mentioned solute, additive, and organic solvent is used as the above-mentioned electrolyte, the electrolyte is further prevented from being decomposed upon reaction with the positive electrode and/or negative electrode, whereby the storage characteristics of the battery in a charged state is further improved.

In the lithium secondary battery according to the present invention, a known solvent that has been conventionally generally used may be used as a solvent in the above-mentioned electrolyte. Examples of a usable solvent include ethylene carbonate, propylene carbonate, vinylene carbonate, butylene carbonate, dimethyl carbonate, diethyl carbonate, methyl ethyl carbonate, sulfolane, tetrahydrofuran, 1,3-dioxolane, 1,2-diethoxyethane, 1,2-dimethoxyethane, ethoxymethoxyethane, and the like. These solvents may be used alone or in combination of two or more types.

Further, as a solute in the electrolyte, the above-mentioned imide group lithium salt or methide group lithium salt may be used together with any other solutes.

Further, as a polymer to be used in the above-mentioned gelated polymer electrolyte, a polymer that has been conventionally generally used may be used. Examples of a usable polymer include polyethylene oxide, polypropylene oxide, cross-linked polyethylene glycol diacrylate, cross-linked polypropylene glycol diacrylate, cross-linked polyethylene glycol methyl ether acrylate, cross-linked polypropylene glycol methyl ether acrylate, and the like.

In the lithium secondary battery according to the present invention, as a positive electrode active material for use in its positive electrode, a known material that has been conventionally generally used may be used. Examples of a usable positive electrode active material include metal compounds capable of occluding and discharging lithium ions, which are represented by metal oxides containing at least one of manganese, cobalt, nickel, iron, vanadium, niobium and the like; and lithium-containing transition metal oxides such as $LiCoO_2$, $LiNiO_2$, $LiMnO_2$, $LiMn_2O_4$, $LiFeO_2$, $LiCo_{0.5}Ni_{0.5}O_2$, and $LiNi_{0.7}Co_{0.2}Mn0.1O_2$.

Further, in the lithium secondary battery according to the present invention, as a negative electrode active material for use in its negative electrode, a known negative electrode material that has been conventionally generally used may be used. Examples of a usable negative electrode active material include carbon materials capable of occluding and discharging lithium ions such as natural graphite, artificial graphite, coke, and calcined products of organic substances; lithium alloys such as an Li—Al alloy, an Li—Mg alloy, an Li—In alloy, and an Li—Al—Mn alloy; and lithium metals.

These and other objects, advantages and features of the invention will become apparent from the following description thereof taken in conjunction with the accompanying drawings which illustrate specific embodiment of the invention.

DESCRIPTION OF THE PREFERRED EMBODIMENTS

Figure 1:
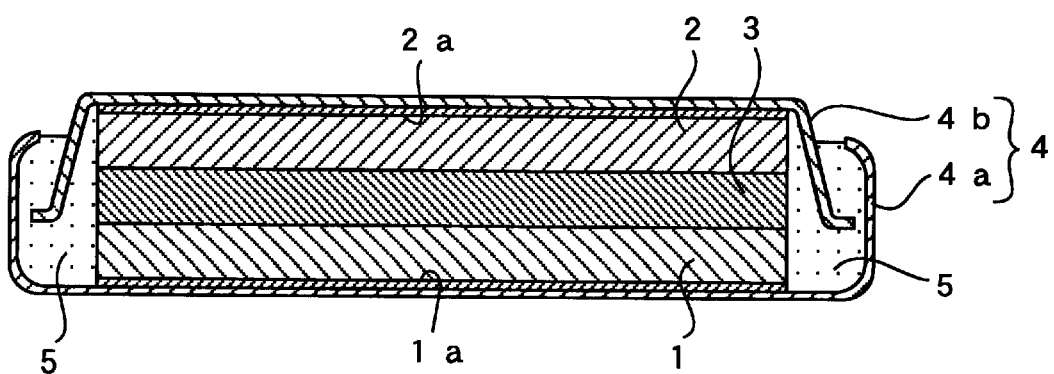
FIG. 1 is a sectional illustration showing the internal construction of each of the lithium secondary batteries fabricated in examples and comparative examples of the present invention.

The following examples specifically illustrate lithium secondary batteries according to the present invention. Further, comparative examples will be taken to make it clear that in the lithium secondary batteries of the examples, decrease in the discharge capacity is restrained even when the batteries in a charged state are stored under high temperature conditions. It should be appreciated that the lithium secondary batteries according to the present invention are not particularly limited to those in the following examples, and various changes and modifications may be made in the invention without departing from the spirit and scope thereof.

EXAMPLE A1

In the example A1, a positive electrode and a negative electrode were fabricated in the following manner, and an electrolyte was prepared in the following manner, to fabricate a flat-type lithium secondary battery as shown in FIG. 1.

Fabrication of Positive Electrode

A lithium-containing composite cobalt dioxide $LiCoO_2$ was used as a positive electrode active material. Powder of $LiCoO_2$, carbon materials such as artificial carbon, acetylene black, and graphite as a conductive agent, and a solution obtained by dissolving polyvinylidene fluoride as a binding agent in N-methyl-2-pyrolidone were mixed, to prepare a slurry containing the powder of $LiCoO_2$, the conductive agent, and the polyvinylidene fluoride in the weight ratio of 90:5:5. Subsequently, the slurry was uniformly applied to one side of an aluminum foil as a positive-electrode current collector 1a by means of the doctor blade coating method. The slurry on the positive-electrode current collector 1a was heat-treated at 130° C. for 2 hours to remove the N-methyl-2-pyrolidone as a solvent, after which the positive-electrode current collector 1a which was coated with the slurry was rolled by a roll press, to obtain a positive electrode 1.

Fabrication of Negative Electrode

Natural graphite ($d_{002}$=3.35 Å) was used as a negative electrode active material. Powder of the natural graphite and a solution obtained by dissolving polyvinylidene fluoride as a binding agent in N-methyl-2-pyrolidone were mixed, to prepare a slurry containing the powder of the natural graphite and the polyvinylidene fluoride in the weight ratio of 95:5. Subsequently, the slurry was uniformly applied to one side of a copper foil as a negative-electrode current collector 2a by means of the doctor blade coating method. The slurry on the negative-electrode current collector 2a was heat-treated at 130° C. for 2 hours to remove the N-methyl-2-pyrolidone as a solvent, after which the negative-electrode current collector 2a which was coated with the slurry was rolled, to obtain a negative electrode 2.

Preparation of Electrolyte

The example A1 employed as a solute $LiN(CF_3SO_2)_2$, which is an imide group lithium salt represented by the above-mentioned formula $LiN(C_mF_{2m+1}SO_2)(C_nF_{2n+1}SO_2)$ wherein m=1 and n=1.

The above-mentioned $LiN(CF_3SO_2)_2$ was dissolved in a concentration of 1.0 mole/liter in a mixed solvent containing ethylene carbonate (EC) and diethyl carbonate (DEC) in a volume ratio of 40:60 to prepare an electrolyte solution (electrolyte). Then, 1.0 wt % of lithium fluoride LiF was added to the electrolyte solution as an additive.

Fabrication of Battery

In fabricating a battery, as shown in FIG. 1, a microporous film made of polypropylene and impregnated with the above-mentioned electrolyte was interposed as a separator 3 between the positive electrode 1 and the negative electrode 2 respectively fabricated in the above-mentioned manners, after which they were contained in a battery case 4 comprising a positive-electrode can 4a and a negative-electrode can 4b, and the positive electrode 1 was connected to the positive-electrode can 4a via the positive-electrode current collector 1a while the negative electrode 2 was connected to the negative-electrode can 4b via the negative-electrode current collector 2a, to electrically separate the positive-electrode can 4a and the negative-electrode can 4b from each other by an insulating packing 5, to obtain a lithium secondary batter of example A1 having a capacity of 8 mAh.

EXAMPLE A2

In the example A2, a lithium secondary battery was fabricated in the same manner as that in the above-mentioned example A1 except that only the electrolyte used in the example A1 was changed.

In preparing an electrolyte, the example A2 employed as a solute $LiN(C_2F_5SO_2)_2$, which is an imide group lithium salt represented by the above-mentioned formula $LiN(C_mF_{2m+1}SO_2)(C_nF_{2n+1}SO_2)$ wherein m=2 and n=2.

The above-mentioned $LiN(C_2F_5SO_2)_2$ was dissolved in a concentration of 1.0 mole/liter in a mixed solvent containing ethylene carbonate (EC) and diethyl carbonate (DEC) in a volume ratio of 40:60 to prepare an electrolyte solution (electrolyte). Then, 1.0 wt % of lithium fluoride LiF was added to the electrolyte solution as an additive.

EXAMPLE A3

In the example A3, a lithium secondary battery was fabricated in the same manner as that in the above-mentioned example A1 except that only the electrolyte used in the example A1 was changed.

In preparing an electrolyte, the example A3 employed as a solute $LiN(CF_3SO_2)(C_4F_9SO_2)$, which is an imide group lithium salt represented by the above-mentioned formula $LiN(C_mF_{2m+1}SO_2)(C_nF_{2n+1}SO_2)$ wherein m=1 and n=4.

The above-mentioned $LiN(CF_3SO_2)(C_4F_9SO_2)$ was dissolved in a concentration of 1.0 mole/liter in a mixed solvent containing ethylene carbonate (EC) and diethyl carbonate (DEC) in a volume ratio of 40:60 to prepare an electrolyte solution (electrolyte). Then, 1.0 wt % of lithium fluoride LiF was added to the electrolyte solution as an additive.

EXAMPLE B1

In the example B1, a lithium secondary battery was fabricated in the same manner as that in the above-mentioned example A1 except that only the electrolyte used in the example A1 was changed.

In preparing an electrolyte, the example B1 employed as a solute $LiN(CF_3SO_2)_2$, which is an imide group lithium salt represented by the above-mentioned formula $LiN(C_mF_{2m+1}SO_2)(C_nF_{2n+1}SO_2)$ wherein m=1 and n=1, as in the case of the above-mentioned example A1.

The above-mentioned $LiN(CF_3SO_2)_2$ was dissolved in a concentration of 1.0 mole/liter in a mixed solvent containing ethylene carbonate (EC) and diethyl carbonate (DEC) in a volume ratio of 40:60 to prepare an electrolyte solution (electrolyte). Then, 1.0 wt % of trilithium phosphate $Li_3PO_4$ was added to the electrolyte solution as an additive.

EXAMPLE B2

In the example B2, a lithium secondary battery was fabricated in the same manner as that in the above-mentioned example A1 except that only the electrolyte used in the example A1 was changed.

In preparing an electrolyte, the example B2 employed as a solute $LiN(C_2F_5SO_2)_2$, which is an imide group lithium salt represented by the above-mentioned formula $LiN(C_mF_{2m+1}SO_2)(C_nF_{2n+1}SO_2)$ wherein m=2 and n=2, as in the case of the above-mentioned example A2.

The above-mentioned $LiN(C_2F_5SO_2)_2$ was dissolved in a concentration of 1.0 mole/liter in a mixed solvent containing ethylene carbonate (EC) and diethyl carbonate (DEC) in a volume ratio of 40:60 to prepare an electrolyte solution (electrolyte). Then, 1.0 wt % of trilithium phosphate $Li_3PO_4$ was added to the electrolyte solution as an additive.

EXAMPLE B3

In the example B3, a lithium secondary battery was fabricated in the same manner as that in the above-mentioned example A1 except that only the electrolyte used in the example A1 was changed.

In preparing an electrolyte, the example B3 employed as a solute $LiN(CF_3SO_2)(C_4F_9SO_2)$, which is an imide group lithium salt represented by the above-mentioned formula $LiN(C_mF_{2m+1}SO_2)(C_nF_{2n+1}SO_2)$ wherein m=1 and n=4, as in the case of the above-mentioned example A3.

The above-mentioned $LiN(CF_3SO_2)(C_4F_9SO_2)$ was dissolved in a concentration of 1.0 mole/liter in a mixed solvent containing ethylene carbonate (EC) and diethyl carbonate (DEC) in a volume ratio of 40:60 to prepare an electrolyte solution (electrolyte). Then, 1.0 wt % of trilithium phosphate $Li_3PO_4$ was added to the electrolyte solution as an additive.

EXAMPLE C1

In the example C1, a lithium secondary battery was fabricated in the same manner as that in the above-mentioned example A1 except that only the electrolyte used in the example A1 was changed.

In preparing an electrolyte, the example C1 employed as a solute $LiC(CF_3SO_2)_3$, which is a methide group lithium salt represented by $LiC(C_pF_{2p+1}SO_2)(C_qF_{2q+1}SO_2)(C_rF_{2r+1}SO_2)$ wherein p=1, q=1, and r=1.

The above-mentioned $LiC(CF_3SO_2)_3$ was dissolved in a concentration of 1.0 mole/liter in a mixed solvent containing ethylene carbonate (EC) and diethyl carbonate (DEC) in a volume ratio of 40:60 to prepare an electrolyte solution (electrolyte). Then, 1.0 wt % of lithium fluoride LiF was added to the electrolyte solution as an additive.

EXAMPLE C2

In the example C2, a lithium secondary battery was fabricated in the same manner as that in the above-mentioned example A1 except that only the electrolyte used in the example A1 was changed.

In preparing an electrolyte, the example C2 employed as a solute $LiC(CF_3SO_2)_3$, which is a methide group lithium salt represented by $LiC(C_pF_{2p+1}SO_2)(C_qF_{2q+1}SO_2)(C_rF_{2r+1}SO_2)$ wherein p=1, q=1, and r=1, as in the case of the above-mentioned example C1.

The above-mentioned $LiC(CF_3SO_2)_3$ was dissolved in a concentration of 1.0 mole/liter in a mixed solvent containing ethylene carbonate (EC) and diethyl carbonate (DEC) in a volume ratio of 40:60 to prepare an electrolyte solution (electrolyte). Then, 1.0 wt % of trilithium phosphate $Li_3PO_4$ was added to the electrolyte solution as an additive.

COMPARATIVE EXAMPLE 1

In the comparative example 1, a lithium secondary battery was fabricated in the same manner as that in the above-mentioned example A1 except that only the electrolyte used in the example A1 was changed.

In preparing an electrolyte, the comparative example 1 employed as a solute $LiN(CF_3SO_2)_2$, which is an imide group lithium salt represented by the above-mentioned formula $LiN(C_mF_{2m+1}SO_2)(C_nF_{2n+1}SO_2)$ wherein m=1 and n=1, as in the case of the above-mentioned examples A1 and B1.

The above-mentioned $LiN(CF_3SO_2)_2$ was dissolved in a concentration of 1.0 mole/liter in a mixed solvent containing ethylene carbonate (EC) and diethyl carbonate (DEC) in a volume ratio of 40:60 to prepare an electrolyte solution (electrolyte). Neither of a fluoride and phosphorus compound was added to the electrolyte solution.

COMPARATIVE EXAMPLE 2

In the comparative example 2, a lithium secondary battery was fabricated in the same manner as that in the above-mentioned example A1 except that only the electrolyte used in the example A1 was changed.

In preparing an electrolyte, the comparative example 2 employed as a solute $LiN(C_2F_5SO_2)_2$, which is an imide group lithium salt represented by the above-mentioned formula $LiN(C_mF_{2m+1}SO_2)(C_nF_{2n+1}SO_2)$ wherein m=2 and n=2, as in the case of the above-mentioned examples A2 and B2.

The above-mentioned $LiN(C_2F_5SO_2)_2$ was dissolved in a concentration of 1.0 mole/liter in a mixed solvent containing ethylene carbonate (EC) and diethyl carbonate (DEC) in a volume ratio of 40:60 to prepare an electrolyte solution (electrolyte). Neither of a fluoride and phosphorus compound was added to the electrolyte solution.

COMPARATIVE EXAMPLE 3

In the comparative example 3, a lithium secondary battery was fabricated in the same manner as that in the above-mentioned example A1 except that only the electrolyte used in the example A1 was changed.

In preparing an electrolyte, the comparative example 3 employed as a solute $LiN(CF_3SO_2)(C_4F_9SO_2)$, which is an imide group lithium salt represented by the above-mentioned formula $LiN(C_mF_{2m+1}SO_2)(C_nF_{2n+1}SO_2)$ wherein m=1 and n=4, as in the case of the above-mentioned examples A3 and B3.

The above-mentioned $LiN(CF_3SO_2)(C_4F_9SO_2)$ was dissolved in a concentration of 1.0 mole/liter in a mixed solvent containing ethylene carbonate (EC) and diethyl carbonate (DEC) in a volume ratio of 40:60 to prepare an electrolyte solution (electrolyte). Neither of a fluoride and phosphorus compound was added to the electrolyte solution.

COMPARATIVE EXAMPLE 4

In the comparative example 4, a lithium secondary battery was fabricated in the same manner as that in the above-mentioned example A1 except that only the electrolyte used in the example A1 was changed.

In preparing an electrolyte, the comparative example 4 employed as a solute $LiC(CF_3SO_2)_3$, which is a methide group lithium salt represented by $LiC(C_pF_{2p+1}SO_2)(C_qF_{2q+1}SO_2)(C_rF_{2r+1}SO_2)$ wherein p=1, q=1, and r=1, as in the case of the above-mentioned examples C1 and C2.

The above-mentioned $LiC(CF_3SO_2)_3$ was dissolved in a concentration of 1.0 mole/liter in a mixed solvent containing ethylene carbonate (EC) and diethyl carbonate (DEC) in a volume ratio of 40:60 to prepare an electrolyte solution (electrolyte). Neither of a fluoride and phosphorus compound was added to the electrolyte solution.

Each of the lithium secondary batteries in the examples A1 to A3, B1 to B3, C1, C2, and the comparative examples 1 to 4 fabricated as above was charged with constant current of 1 mA up to 4.1 V and was then discharged with constant current of 1 mA up to 2.5 V at room temperature of 25° C., to find an initial discharge capacity $Q_0$. Subsequently, each of the above-mentioned batteries was charged with constant current of 1 mA up to 4.1 V, was then stored for 10 days at a temperature of 60° C., and thereafter, was discharged with constant current of 1 mA up to 2.5 V, to find a discharge capacity $Q_1$ after the storage under high temperature conditions. The ratio of the discharging capacity $Q_1$ after the storage under high temperature conditions to the initial discharging capacity $Q_0$ $[(Q_0/Q_1)\times100]$ was found as the percentage of capacity retention. The results were shown in the following Table 1.

TABLE 1 solvent EC:DEC = 40:60 (volume ratio)
amount of additive = 1.0 wt %

| type of solute | additive | percentage of capacity retention (%) |
|---|---|---|
| example A1 | $LiN(CF_3SO_2)_2$ | LiF | 71 |
| example A2 | $LiN(C_2F_5SO_2)_2$ | LiF | 76 |
| example A3 | $LiN(CF_3SO_2)(C_4F_9SO_2)$ | LiF | 74 |
| example B1 | $LiN(CF_3SO_2)_2$ | $Li_3PO_4$ | 70 |
| example B2 | $LiN(C_2F_5SO_2)_2$ | $Li_3PO_4$ | 77 |
| example B3 | $LiN(CF_3SO_2)(C_4F_9SO_2)$ | $Li_3PO_4$ | 73 |
| example C1 | $LiN(CF_3SO_2)_2$ | LiF | 70 |
| example C2 | $LiN(CF_3SO_2)_2$ | $Li_3PO_4$ | 69 |
| comparative example 1 | $LiN(CF_3SO_2)_2$ | — | 35 |
| comparative example 2 | $LiN(C_2F_5SO_2)_2$ | — | 42 |
| comparative example 3 | $LiN(CF_3SO_2)(C_4F_9SO_2)$ | — | 40 |
| comparative example 4 | $LiN(CF_3SO_2)_2$ | — | 34 |

As apparent from the result, each of the lithium secondary batteries in the comparative examples 1 to 4 employing the electrolyte solution using as a solute an imide group lithium salt or a methide group lithium salt, to which neither of a fluoride or phosphorus compound is added presented a low percentage of capacity retention of 34 to 42% after the storage under high temperature conditions. On the other hand, each of the lithium secondary batteries in the examples A1 to A3, B1 to B3, C1, and C2 employing the above-mentioned electrolyte solution to which lithium fluoride LiF or trilithium phosphate $Li_3PO_4$ is added presented a high percentage of capacity retention of 69 to 76% after the storage under high temperature conditions, and was remarkably improved in storage characteristics in a charged state.

The reason for this is conceivably that when a fluoride or a phosphorus compound is added to the electrolyte solution using as a solute an imide group lithium salt or a methide group lithium salt, a protective film is formed on a surface of the positive electrode 1 or negative electrode 2. The protective film thus formed serves to prevent direct contact between the electrolyte solution and the positive electrode or negative electrode and hence, the electrolyte solution is prevented from being decomposed when the lithium secondary battery is stored in a charged state, resulting in improved storage characteristics of the battery in a charge state.

Although each of the lithium secondary battery in the above-mentioned examples A1 to A3, B1 to B3, C1, and C2 employed the mixed solvent containing ethylene carbonate (EC) and diethyl carbonate (DEC) in a volume ratio of 40:60 as a solvent in the electrolyte solution, substantially the same effects may be attained when propylene carbonate (PC), butylene carbonate (BC), dimethyl carbonate (DMC), sulfolane (SL), vinylene carbonate (VC), methyl ethyl carbonate (MEC), tetrahydrofuran (THF), 1,2-diethoxyethane (DEE), 1,2-dimethoxyethane (DME), ethoxymethoxyethane (EME), and the like besides the above-mentioned ethylene carbonate (EC) and diethyl carbonate (DEC) are used alone or in combination of two or more types.

EXAMPLES A4 TO A17

In the examples A4 to A17, lithium secondary batteries were fabricated in the same manner as that in the above-mentioned example A1 except that only the electrolyte used in the example A1 was changed.

In preparing an electrolyte, the examples A4 to A17 each employed as a solute $LiN(C_2F_5SO_2)_2$, which is an imide group lithium salt represented by the above-mentioned formula $LiN(C_mF_{2m+1}SO_2)(C_nF_{2n+1}SO_2)$ wherein m=2 and n=2, and the above-mentioned $LiN(C_2F_5SO_2)_2$ was dissolved in a concentration of 1.0 mole/liter in a mixed solvent containing ethylene carbonate (EC) and diethyl carbonate (DEC) in a volume ratio of 40:60 to prepare an electrolyte solution (electrolyte), as in the case of the above-mentioned example A2.

Then, in each of the examples A4 to A17, the type of the fluoride added to the above-mentioned electrolyte solution as an additive in the above-mentioned example A2 was changed. Specifically, the example A4 employed AgF; the example A5 employed $CoF_2$; the example A6 employed $CoF_3$; the example A7 employed CuF; the example A8 employed $CuF_2$; the example A9 employed $FeF_2$; the example A10 employed $FeF_3$; the example A11 employed $MnF_2$; the example A12 employed $MnF_3$; the example A13 employed $SnF_2$; the example A14 employed $SnF_4$; the example A15 employed $TiF_3$; the example A16 employed $TiF_4$; and the example A17 employed $ZrF_4$, as shown in the following Table 2. These additives were respectively added to the electrolyte solutions at the ratio of 1.0 wt % based on the total weight of each electrolyte solution.

EXAMPLE B4

In the example B4, a lithium secondary battery was fabricated in the same manner as that in the above-mentioned example A1 except that only the electrolyte used in the example A1 was changed.

In preparing an electrolyte, the example B4 employed as a solute $LiN(C_2F_5SO_2)_2$, which is an imide group lithium salt represented by the above-mentioned formula $LiN(C_mF_{2m+1}SO_2)(C_nF_{2n+1}SO_2)$ wherein m=2 and n=2, and the above-mentioned $LiN(C_2F_5SO_2)_2$ was dissolved in a concentration of 1.0 mole/liter in a mixed solvent containing ethylene carbonate (EC) and diethyl carbonate (DEC) in a volume ratio of 40:60 to prepare an electrolyte solution (electrolyte), as in the case of the above-mentioned example B2.

Then, in the example B4, the type of the phosphorus compound added to the above-mentioned electrolyte solution as an additive in the above-mentioned example B2 was changed. Specifically, 1.0 wt % of $LiPO_3$ was added to the electrolyte solution as shown in the following Table 2.

With respect to each of the lithium secondary batteries according to the examples A4 to A17 and B4 fabricated as above, the percentage of capacity retention (%) was found in the same manner as that in each of the above-mentioned lithium secondary batteries. The results, along with those of the above-mentioned examples A2, B2, and comparative example 2, are shown in the following Table 2.

TABLE 2 solvent EC:DEC = 40:60 (volume ratio)
amount of additive = 1.0 wt %

| | type of solute | additive | percentage of capacity retention (%) |
|---|---|---|---|
| example A2 | $LiN(C_2F_5SO_2)_2$ | LiF | 76 |
| example A4 | $LiN(C_2F_5SO_2)_2$ | AgF | 72 |
| example A5 | $LiN(C_2F_5SO_2)_2$ | $CoF_2$ | 73 |
| example A6 | $LiN(C_2F_5SO_2)_2$ | $CoF_3$ | 74 |
| example A7 | $LiN(C_2F_5SO_2)_2$ | CuF | 73 |
| example A8 | $LiN(C_2F_5SO_2)_2$ | $CuF_2$ | 75 |
| example A9 | $LiN(C_2F_5SO_2)_2$ | $FeF_2$ | 74 |
| example A10 | $LiN(C_2F_5SO_2)_2$ | $FeF_3$ | 71 |
| example A11 | $LiN(C_2F_5SO_2)_2$ | $MnF_2$ | 76 |
| example A12 | $LiN(C_2F_5SO_2)_2$ | $MnF_3$ | 78 |
| example A13 | $LiN(C_2F_5SO_2)_2$ | $SnF_2$ | 75 |
| example A14 | $LiN(C_2F_5SO_2)_2$ | $SnF_4$ | 73 |
| example A15 | $LiN(C_2F_5SO_2)_2$ | $TiF_3$ | 72 |
| example A16 | $LiN(C_2F_5SO_2)_2$ | $TiF_4$ | 70 |
| example A17 | $LiN(C_2F_5SO_2)_2$ | $ZrF_4$ | 73 |
| example B2 | $LiN(C_2F_5SO_2)_2$ | $Li_3PO_4$ | 77 |
| example B4 | $LiN(C_2F_5SO_2)_2$ | $LiPO_3$ | 77 |
| comparative example 2 | $LiN(C_2F_5SO_2)_2$ | — | 42 |

As apparent from the result, each of the lithium secondary batteries in the examples A2 and A4 to A17 in which the fluoride selected from the group consisting of LiF, AgF, $CoF_2$, $CoF_3$, CuF, $CuF_2$, $FeF_2$, $FeF_3$, $MnF_2$, $MnF_3$, $SnF_2$, $SnF_4$, $TiF_3$, $TiF_4$, and $ZrF_4$ was added to the electrolyte solution using as a solute an imide group lithium salt and each of the lithium secondary batteries in the examples B2 and B4 in which the phosphorus compound selected from the group consisting of $LiPO_3$ and $Li_3PO_4$ was added to the above-mentioned electrolyte solution presented a high percentage of capacity retention of 70 to 78%, and was remarkably improved in storage characteristics in a charged state as compared with the lithium secondary battery in the comparative example 2.

Although each of the lithium secondary battery in the above-mentioned examples A4 to A17 and B4 cites the electrolyte solution using as a solute an imide group lithium salt, substantially the same effects may be attained by an electrolyte solution using as a solute a methide group lithium salt.

EXAMPLES D1 TO D6

In the examples D1 to D6, a lithium secondary batteries were fabricated in the same manner as that in the above-mentioned example A1 except that only the electrolyte used in the example A1 was changed.

In preparing an electrolyte, the examples D1 to D6 each employed as a solute $LiN(C_2F_5SO_2)_2$, which is an imide group lithium salt represented by the above-mentioned formula $LiN(C_mF_{2m+1}SO_2)(C_nF_{2n+1}SO_2)$ wherein m=2 and n=2, and the above-mentioned $LiN(C_2F_5SO_2)_2$ was dissolved in a concentration of 1.0 mole/liter in a mixed solvent containing ethylene carbonate (EC) and diethyl carbonate (DEC) in a volume ratio of 40:60 to prepare an electrolyte solution (electrolyte), as in the above-mentioned example B2.

In the examples D1 to D6, there were used as an additive added to the above-mentioned electrolyte a mixture containing LiF and $Li_3PO_4$ in a weight ratio of 1:1 in the example D1; a mixture containing LiF and $LiPO_3$ in a weight ratio of 1:1 in the example D2; a mixture containing $TiF_4$ and $Li_3PO_4$ in a weight ratio of 1:1 in the example D3; a mixture containing $TiF_4$ and $LiPO_3$ in a weight ratio of 1:1 in the example D4; a mixture containing LiF and $TiF_4$ in a weight ratio of 1:1 in the example D5; and a mixture containing $Li_3PO_4$ and $LiPO_3$ in a weight ratio of 1:1 in the example D6, as shown in the following Table 3. These additives were respectively added to the electrolyte solutions in at the ratio of 1.0 wt % based on the total weight of each electrolyte solution.

With respect to each of the lithium secondary batteries according to the examples D1 to D6 fabricated as above, the percentage of capacity retention (%) was found in the same manner as that in each of the above-mentioned lithium secondary batteries. The results, along with that of the above-mentioned comparative example 2, are shown in the following Table 3.

TABLE 3 solvent EC:DEC = 40:60 (volume ratio)
amount of additive = 1.0 wt %

| type of solute | additive (weight ratio = 1:1) | percentage of capacity retention (%) |
|---|---|---|
| example D1 | $LiN(C_2F_5SO_2)_2$ | LiF + $Li_3PO_4$ | 83 |
| example D2 | $LiN(C_2F_5SO_2)_2$ | LiF + $LiPO_3$ | 81 |
| example D3 | $LiN(C_2F_5SO_2)_2$ | $TiF_4$ + $Li_3PO_4$ | 82 |
| example D4 | $LiN(C_2F_5SO_2)_2$ | $TiF_4$ + $LiPO_3$ | 82 |
| example D5 | $LiN(C_2F_5SO_2)_2$ | LiF + $TiF_4$ | 74 |
| example D6 | $LiN(C_2F_5SO_2)_2$ | $Li_3PO_4$ + $LiPO_3$ | 76 |
| comparative example 2 | $LiN(C_2F_5SO_2)_2$ | — | 42 |

As apparent from the result, each of the lithium secondary batteries in the examples D1 to D6 in which two types of materials selected from a fluoride and phosphorus compound were added to the electrolyte solution as an additive was remarkably improved in storage characteristics in a charged state as compared with the lithium secondary battery in the comparative example 2 in which neither of a fluoride and a phosphorus compound was added to the electrolyte solution.

Further, when the lithium secondary batteries in the examples D1 to D6 were compared with each other, it was found that the lithium secondary batteries in the examples D1 and D4 in which the mixture of the fluoride and phosphorus compound is added to the electrolyte solution presented further improved percentage of capacity retention as compared with the lithium secondary battery in the example D5 in which the mixture of two types of fluorides was added to the electrolyte solution and the lithium secondary battery in the example D6 in which the mixture of two types of phosphorus compounds was added to the electrolyte solution.

Although each of the lithium secondary battery in the above-mentioned examples D1 to D6 cites the electrolyte solution using as a solute an imide group lithium salt, substantially the same effects may be attained by an electrolyte solution using as a solute a methide group lithium salt.

EXAMPLES D1.1 TO D1.6

In the examples D1.1 to D1.6, lithium secondary batteries were fabricated in the same manner as that in the above-mentioned example A1 except that only the electrolyte used in the example A1 was changed.

In each of the examples D1.1 to D1.6, in preparing an electrolyte, $LiN(C_2F_5SO_2)_2$ was dissolved in a concentration of 1.0 mole/liter in a mixed solvent containing ethylene carbonate (EC) and diethyl carbonate (DEC) in a volume ratio of 40:60 to prepare an electrolyte solution (electrolyte), and a mixture containing LiF and $Li_3PO_4$ in a weight ratio of 1:1 was added to the electrolyte solution, as in the above-mentioned example D1.

In the examples D1.1 to D1.6, the amount of the mixture containing LiF and $Li_3PO_4$ in a weight ratio of 1:1 added to the above-mentioned electrolyte solution in the example D1 was changed as shown in the following Table 4. More specifically, an amount of the mixture added to the electrolyte solution was 0.001 wt % based on the total weight of the electrolyte solution in the example D1.1; 0.01 wt % based on the total weight of the electrolyte solution in the example D1.2; 0.1 wt % based on the total weight of the electrolyte solution in the example D1.3; 2.0 wt % based on the total weight of the electrolyte solution in the example D1.4; 5.0 wt % based on the total weight of the electrolyte solution in the example D1.5; and 10.0 wt % based on the total weight of the electrolyte solution in the example D1.6.

With respect to each of the lithium secondary batteries according to the examples D1.1 to D1.6 fabricated as above, the percentage of capacity retention (%) was found in the same manner as that in each of the above-mentioned lithium secondary batteries. The results, along with that of the above-mentioned example D1, are shown in the following Table 4.

TABLE 4 solvent EC:DEC = 40:60 (volume ratio)
additive LiF:$Li_3PO_4$ = 1:1 (weight ratio)

| type of solute | amount of additive (wt %) | percentage of capacity retention (%) |
|---|---|---|
| example D1.1 | $LiN(C_2F_5SO_2)_2$ | 0.001 | 71 |
| example D1.2 | $LiN(C_2F_5SO_2)_2$ | 0.01 | 81 |
| example D1.3 | $LiN(C_2F_5SO_2)_2$ | 0.1 | 82 |
| example D1 | $LiN(C_2F_5SO_2)_2$ | 1.0 | 83 |
| example D1.4 | $LiN(C_2F_5SO_2)_2$ | 2.0 | 83 |
| example D1.5 | $LiN(C_2F_5SO_2)_2$ | 5.0 | 81 |
| example D1.6 | $LiN(C_2F_5SO_2)_2$ | 10.0 | 72 |

As apparent from the result, each of the lithium secondary batteries in the examples D1.1 to D1.6 in which the mixture containing LiF and $Li_3PO_4$ in a weight ratio of 1:1 was added to the electrolyte solution as an additive in the range of 0.001 to 10.0 wt % based on the total weight of the electrolyte solution was remarkably improved in storage characteristics in a charged state as compared with the lithium secondary battery in the comparative example 2 in which neither of a fluoride and phosphorus compound was added to the electrolyte solution.

Further, when the lithium secondary batteries in the examples D1 and D1.1 to D1.6 were compared with each other, it was found that the lithium secondary batteries in the examples D1 and D1.2 to D1.5 in which the mixture containing $Li_3PO_4$ and $LiPO_3$ in a weight ratio of 1:1 were added to the electrolyte solution as an additive in the range of 0.01 to 5.0 wt % based on the total weight of the electrolyte solution presented further improved percentage of capacity retention.

The reason for this is conceivably that when an amount of the additive containing $Li_3PO_4$ and $LiPO_3$ in a weight ratio of 1:1 added to the electrolyte solution is too small, a film formed on a surface of the positive electrode or negative electrode by the additive is hardly made uniform, while when the amount is too large, the film becomes thick, resulting in increased resistance.

Although each of the above-mentioned examples D1 and D1.1 to D1.6 presents a case where the mixture of LiF and $Li_3PO_4$ is added to the electrolyte solution using as a solute an imide group lithium salt, substantially the same tendency may be observed in a case where a mixture of another fluoride and phosphorus compound; a mixture of fluorides; a mixture of phosphorus compounds; or one type of fluoride or phosphorus compound is added, and in a case where the electrolyte solution employs as a solute a methide group lithium salt.

EXAMPLES E1 AND E2

In each of the examples E1 and E2, in preparing an electrolyte, $LiN(C_2F_5SO_2)_2$ was dissolved in a concentration of 1.0 mole/liter in a mixed solvent containing ethylene carbonate (EC) and diethyl carbonate (DEC) in a volume ratio of 40:60 to prepare an electrolyte solution (electrolyte), as in the case of the above-mentioned example D1.

Further, as a polymer material, the example E1 employed polyethylene oxide (PEO) having molecular weight of about 200,000 while the example E2 employed polyvinylidene fluoride (PVdF) having molecular weight of about 200,000.

Films respectively composed of the above-mentioned polymer materials were formed on respective positive electrodes by means of the casting method. Subsequently, an additive comprising a mixture containing LiF and $Li_3PO_4$ in a weight ratio of 1:1, together with the above-mentioned electrolyte solution, was added to each of the films, thus giving a gelated polymer electrolyte containing 1.0 wt % of the additive comprising the mixture containing LiF and $Li_3PO_4$ in a weight ratio of 1:1 on the positive electrode. Except for the above, the same procedure as that in the above-mentioned example A1 was taken to fabricate each lithium secondary battery.

With respect to each of the lithium secondary batteries according to the examples E1 and E2 fabricated as above, the percentage of capacity retention (%) was found in the same manner as that in each of the above-mentioned lithium secondary batteries. The results, along with that of the above-mentioned example D1, are shown in the following Table 5.

| | solvent EC:DEC = 40:60 (volume ratio) additive LiF:$Li_3PO_4$ = 1:1 (weight ratio) | | |
|---|---|---|---|
| type of solute | amount of additive (wt %) | polymer material | percentage of capacity retention (%) |
| example E1 $LiN(C_2F_5SO_2)_2$ | 1.0 | PEO | 71 |
| example E2 $LiN(C_2F_5SO_2)_2$ | 1.0 | PVdF | 81 |
| example D1 $LiN(C_2F_5SO_2)_2$ | 1.0 | — | 83 |

As apparent from the result, each of the lithium secondary batteries in the examples E1 and E2 employing the gelated polymer electrolyte obtained by adding the mixture containing LiF and $Li_3PO_4$ in a weight ratio of 1:1 together with the electrolyte solution to the polymer material presented further improved percentage of capacity retention as compared with the lithium secondary battery in the example D1 employing the electrolyte solution to which the mixture containing LiF and $Li_3PO_4$ in a weight ratio of 1:1 is added.

Although each of the above-mentioned examples E1 and E2 presents a case where the mixture containing LiF and $Li_3PO_4$ in a weight ratio of 1:1, together with the electrolyte solution using as a solute an imide group lithium salt, was added to the polymer material, substantially the same effects may be attained in a case where a mixture of another fluoride and phosphorus compound; a mixture of fluorides; a mixture of phosphorus compounds; or one type of fluoride or phosphorus compound is added, and in a case where the electrolyte solution employs as a solute a methide group lithium salt.

Although the present invention has been fully described by way of examples, it is to be noted that various changes and modifications will be apparent to those skilled in the art. Therefore, unless otherwise such changes and modifications depart from the scope of the present invention, they should be construed as being included therein.

What is claimed is:

1. A lithium secondary battery provided with a positive electrode capable of intercalating and eliminating lithium ions, a negative electrode capable of intercalating and eliminating lithium ions, and an electrolyte, wherein
    at least one of an imide group lithium salt represented by $LiN(C_mF_{2m+1}SO_2)(C_nF_{2n+1}SO_2)$ (wherein m and n each denote an integer of 1 to 4 and may be the same or different from each other) and a methide group lithium salt represented by $LiC(C_pF_{2p+1}SO_2)(C_qF_{2q+1}SO_2)(C_rF_{2r+1}SO_2)$ (wherein p, q, and r each denote an integer of 1 to 4 and may be the same or different from each other) is contained as a component of a solute in said electrolyte, and a fluoride is added to said electrolyte, and wherein
    said fluoride added to the electrolyte is at least one fluoride selected from the group consisting of AgF, $CoF_2$, $CoF_3$, CuF, $CuF_2$, $FeF_2$, LiF, $MnF_2$, $MnF_3$, $SnF_2$, $SnF_4$, $TiF_3$, $TiF_4$, and $ZrF_4$.

2. The lithium secondary battery according to claim 1, wherein
    said electrolyte is a gelated polymer electrolyte.

3. The lithium secondary battery according to claim 1, wherein
    said fluoride is added to the electrolyte in the range of 0.001 to 10.0 wt % based on the total weight of the electrolyte.

4. The lithium secondary battery according to claim 1, wherein
said fluoride is added to the electrolyte in the range of 0.01 to 5.0 wt % based on the total weight of the electrolyte.

5. A lithium secondary battery provided with a positive electrode capable of intercalating and eliminating lithium ions, a negative electrode capable of intercalating and eliminating lithium ions, and an electrolyte, wherein
at least one of an imide group lithium salt represented by $LiN(C_mF_{2m+1}SO_2)(C_nF_{2n+1}SO_2)$ (wherein m and n each denote an integer of 1 to 4 and may be the same or different from each other) and amethide group lithium salt represented by $LiC(C_pF_{2p+1}SO_2)(C_qF_{2q+1}SO_2)(C_rF_{2r+1}SO_2)$ (wherein p, q, and r each denote an integer of 1 to 4 and may be the same or different from each other) is contained as a component of a solute in said electrolyte, and a phosphorus compound is added to said electrolyte, wherein
said phosphorus compound added to the electrolyte is at least one phosphorus compound selected from the group consisting of $LiPO_3$ and $Li_3PO_4$ and wherein said phosphorus compound is added to the electrolyte in the range of 0.001 to 10.0 wt % based on the total weight of the electrolyte.

6. The lithium secondary battery according to claim 5, wherein
said phosphorus compound is added to the electrolyte in the range of 0.01 to 5.0 wt % based on the total weight of the electrolyte.

7. The lithium secondary battery according to claim 5, wherein
said electrolyte is a gelated polymer electrolyte.

8. The lithium secondary battery provided with a positive electrode capable of intercalating and eliminating lithium ions, a negative electrode capable of intercalating and eliminating lithium ions, and an electrolyte, wherein
at least one of an imide group lithium salt represented by $LiN(C_mF_{2m+1}SO_2)(C_nF_{2n+1}SO_2)$ (wherein m and n each denote an integer of 1 to 4 and may be the same or different from each other) and a methide group lithium salt represented by $LiC(C_pF_{2p+1}SO_2)(C_qF_{2q+1}SO_2)(C_rF_{2r+1}SO_2)$ (wherein p, q, and r each denote an integer of 1 to 4 and may be the same or different from each other) is contained as a component in a solute in said electrolyte, and both of a fluoride and a phosphorus compound are added to said electrolyte, wherein
said fluoride added to the electrolyte is at least one fluoride selected from the group consisting of $AgF$, $CoF_2$, $CoF_3$, $CuF$, $CuF_2$, $FeF_2$, $FeF_3$, $LiF$, $MnF_2$, $MnF_3$, $SnF_2$, $SnF_4$, $TiF_3$, $TiF_4$, and $ZrF_4$.

9. The lithium secondary battery according to claim 8, wherein
said phosphorus compound added to the electrolyte is at least one type of phosphorus compound selected from the group consisting of $LiPO_3$ and $Li_3PO_4$.

10. The lithium secondary battery according to claim 8, wherein
a total amount of said fluoride and phosphorus compound added to the electrolyte is in the range of 0.001 to 10.0 wt % based on the total weight of the electrolyte.

11. The lithium secondary battery according to claim 8, wherein
a total amount of said fluoride and phosphorus compound added to the electrolyte is in the range of 0.01 to 5.0 wt % based on the total weight of the electrolyte.

12. The lithium secondary battery according to claim 8, wherein
said electrolyte is a gelated polymer electrolyte.

13. A lithium secondary battery provided with a positive electrode capable of intercalating and eliminating lithium ions, a negative electrode capable of intercalating and eliminating lithium ions. and an electrolyte, wherein
at least one of an imide group lithium salt represented by $LiN(C_mF_{2m+1}SO_2)(C_nF_{2n+1}SO_2)$ (wherein m and n each denote an integer of 1 to 4 and may be the same or different from each other) and a methide group lithium salt represented by $LiC(C_pF_{2p+1}SO_2)(C_qF_{2q+1}SO_2)(C_rF_{2r+1}SO_2)$ (wherein p, q, and r each denote an integer of 1 to 4 and may be the same or different from each other) is contained as a component of a solute in said electrolyte, and a phosphorus compound consisting of $LiPO_3$ is added to said electrolyte.

14. The lithium secondary battery according to claim 13, wherein
said phosphorus compound is added to the total weight of the electrolyte in the range of 0.001 to 10.0 wt % based on the total weight of the electrolyte.

15. The lithium secondary battery according to claim 13, wherein
said phosphorus compound is added to the electrolyte in the range of 0.01 to 5.0 wt % based on the total weight of the electrolyte.

16. The lithium secondary battery according to claim 13, wherein
said electrolyte is a gelated polymer electrolyte.

17. A lithium secondary battery provided with a positive electrode capable of intercalating and eliminating lithium ions, a negative electrode capable of intercalating and eliminating lithium ions, and an electrolyte, wherein
at least one of an imide group lithium salt represented by $LiN(C_mF_{2m+1}SO_2)(C_nF_{2n+1}SO_2)$ (wherein m and n each denote an integer of 1 to 4 and may be the same or different from each other) and a methide group lithium salt represented by $LiC(C_pF_{2p+1}SO_2)(C_qF_{2q+1}SO_2)(C_rF_{2r+1}SO_2)$ (wherein p, q, and r each denote an integer of 1 to 4 and may be the same or different from each other) is contained as a component in a solute in said electrolyte, and both of a fluoride and at least one phosphorus compound selected from the group consisting of $LiPO_3$, and $Li_3PO_4$ are added to said electrolyte, wherein
a total amount of said fluoride and phosphorus compound added to the electrolyte is in the range of 0.001 to 10.0 wt % based on the total weight of the electrolyte.

18. The lithium secondary battery according to claim 17, wherein
a total amount of said fluoride and phosphorus compound added to the electrolyte is in the range of 0.01 to 5.0 wt % based on the total weight of the electrolyte.

19. The lithium secondary battery according to claim 17, wherein
said electrolyte is a gelated polymer electrolyte.

* * * * *